United States Patent [19]

Poldervaart et al.

[11] Patent Number: 4,686,924

[45] Date of Patent: Aug. 18, 1987

[54] FENDER OR SIMILAR DEVICE FOR ABSORBING FORCES OF IMPACT

[75] Inventors: Leendert Poldervaart, La Turbie; Jean C. M. Personnat, Monte Carlo, both of Monaco; Roland P. O. Quinti, Nice, France

[73] Assignee: Single Buoy Moorings Inc., Marly, Switzerland

[21] Appl. No.: 795,236

[22] Filed: Nov. 5, 1985

[30] Foreign Application Priority Data

Nov. 19, 1984 [NL] Netherlands ............... 8403519

[51] Int. Cl.⁴ ............................................. B63B 59/02
[52] U.S. Cl. ....................................... 114/219; 405/212
[58] Field of Search ................... 114/219, 230; 441/3, 441/4; 405/211, 210

[56] References Cited

U.S. PATENT DOCUMENTS

| 3,778,854 | 12/1973 | Chow | 441/4 |
|---|---|---|---|
| 3,901,040 | 8/1975 | Sandberg | 114/219 |
| 4,038,830 | 8/1977 | Sumner | 114/219 |
| 4,098,212 | 7/1978 | Kemper et al. | 114/230 |
| 4,446,806 | 5/1984 | Loire | 114/219 |
| 4,497,593 | 2/1985 | Kramer | 114/219 X |

FOREIGN PATENT DOCUMENTS

| 1041426 | 10/1958 | Fed. Rep. of Germany . | |
| 2260663 | 9/1975 | France . | |
| 2514451 | 4/1983 | France . | |
| 8302024 | 1/1985 | Netherlands . | |
| 1383012 | 2/1975 | United Kingdom | 405/15 |
| 1015041 | 4/1983 | U.S.S.R. | 405/211 |

Primary Examiner—Sherman D. Basinger
Attorney, Agent, or Firm—Young & Thompson

[57] ABSTRACT

A fender surrounding a mooring body and comprising a weight-loaded structure suspended by flexible connecting members from a higher location of the mooring body, which connecting members according to the invention extend upwardly and towards each other towards a point at or adjacent to the vertical axis of the mooring body, such that upon impact by a vessel the fender is tilted and quickly generates a return force.

4 Claims, 9 Drawing Figures

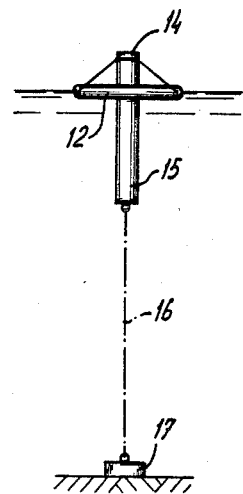
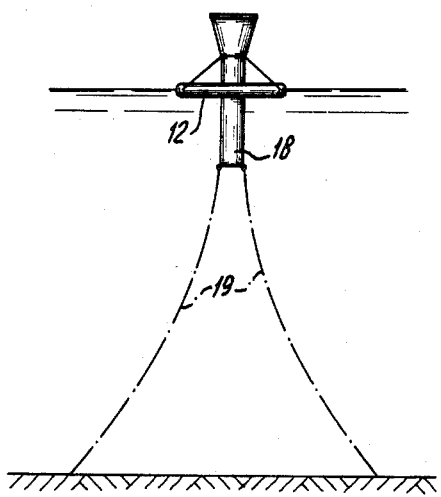
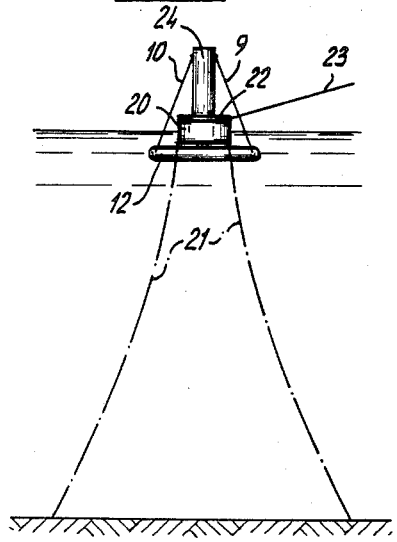
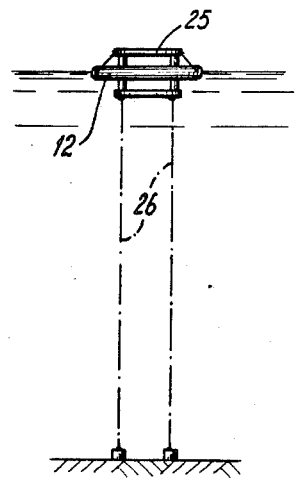

FENDER OR SIMILAR DEVICE FOR ABSORBING FORCES OF IMPACT

The invention relates to a fender or similar device for absorbing forces of impact coming from a mooring or moored floating device, such as a vessel, which fender has been suspended from a mooring body anchored with respect to the water bottom and being of the type allowing the moored device to swing around it about a vertical axis of rotation, said fender comprising a supporting structure, which surrounds said vertical axis of rotation and the mooring body by more than 180° and which is loaded by weights and which at least at the side of the device moored or to be moored is at a distance from the mooring body, which supporting structure at a plurality of locations is suspended from the mooring body by means of movable connecting members attached at points which are at a higher level than the supporting structure.

A fender of this type is known from e.g. No. FR-A-260 663. Said known fender is formed by a rectangular annular weight suspended by means of rods or chains from a tower such that when the fender has to take up impact forces from a vessel the weight is moved horizontally because the rods or chains form a parallel guide system. Upon displacement by a vessel the weight is lifted only slightly and remains parallel to its original position by being displaced substantially horizontally. Due to this the forces counteracting the bumping mass of the vessel remain substantially constant. To be able to counteract the impact forces the weight has to be very large to be able to generate sufficiently quick a horizontal force component counteracting the force of impact coming from the vessel.

With mooring bodies standing upon the water bottom or anchored with respect to the water bottom, such as a tower, a buoy or an upwardly directed swingable column having buoyancy, which column has been anchored by means of a pivot to the bottom of the sea, the circumstances very often are such that a fender of the known type cannot avoid heavy impacts between the vessel to be moored and the mooring body.

Purpose of the invention is to provide a fender which in combination with a mooring body operates more effectively and/or requires less weight for quickly generating a return force.

According to the invention this purpose is achieved in that the supporting structure is suspended by means of connecting members which all converge upwardly towards each other and are attached at points on the mooring body which lie on or adjacent to the vertical axis of rotation.

Due to the fact that the connecting means in principle are directed to a single spot, the fender, upon engagement by a vessel, is tilted in such a way that the portion of the fender turned away from the vessel is lifted upwardly. This generates the return force very quickly, in particular if said end of the fender turned away from the vessel is lifted out of the water. Moreover said end of the fender may have additional weight load.

The fender can extend around the mooring body and can be circular or polygonal. The fender also can have the shape of a horse shoe or U-shape and in that case should at any rate be designed such that it can rotate around the mooring body.

The fender according to the invention can be made in the form of a bumping cushion at the side which will be engaged by the vessel. This, however, is not necessary because its operation is based upon the function of the weight of the fender which weight due to the swinging movement about substantially a single pivot point very quickly generates a sufficiently large return force component. This has a consequence that under certain circumstances the weight can be lower for generating a return force of sufficient magnitude to absorb the impact forces to be expected.

The invention now will be further elucidated with reference to the drawings.

FIG. 1 in side view diagrammatically shows a preferred embodiment of the fender according to the invention.

FIGS. 2, 3, 4 and 5 in side view show diagrammatically a number of alternatives.

Figure 1:
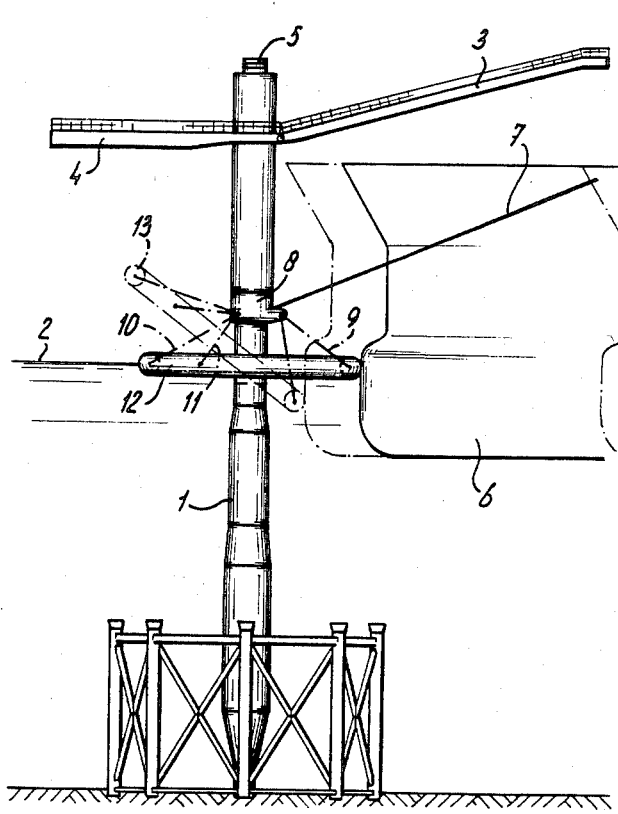

FIG. 1 shows a tower 1, which is attached to the sea bottom and which extends far above the water level 2. At the upper end the tower 1 supports a derrick 3 with counterweight 4 for handling hoses to be connected to a vessel which hoses are not shown but are connected to a rotatable conduit coupling 5 or swivel on top of the tower.

A tanker 6 is moored by means of mooring cables 7 to a ring 8 which is rotatably supported for rotation about a vertical axis upon the upper portion of the tower.

Said ring 8 suspends a heavy ring 12 by means of cables 9,10,11 etc., which ring functions as a fender. If the vessel 6, as shown in FIG. 1, bumps against the fender 12 then said fender at the location of the impact will be forced further downwardly as indicated with interrupted lines, and due to the suspension by means of cables which extend upwardly and towards each other, the opposite end, indicated at 13, will be tilted upwardly and out of the water. The mass of the fender 12 then will generate a moment about an imaginary pivot lying at the intersection of the extension of the cables 9 and 10, which moment generates a return force against the bow of the vessel 6 and forces said vessel backwards with large force.

In the embodiment of FIG. 2 the fender is of the same type as shown in FIG. 1 and suspended from the top 14 of a cylindrical buoy 15 which by means of a tension resisting member 16 is attached to a bottom anchor 17.

In the embodiment of FIG. 3 a cylindrical buoy 18 is used as well, which, however, is anchored by means of anchor chains 19. The fender is suspended in a similar way.

In all embodiments the fender is shown at the level of the water level.

In the embodiment of FIG. 4 the mooring body again has the form of a buoy 20, anchored by means of chains 21 and carrying a turn-table 22 for an anchor line 23, which turn-table has a column 24 to which the cables 9 and 10 are connected which support the fender 12 which in this case lies under water.

FIG. 5 diagrammatically shows that the same principle can be used as well with a semi-submersible floating platform structure 25, which by means of vertically downwardly extending cables 26 is attached to the sea bottom.

In all previous embodiments the fender extends around the mooring body and in top view can be circular.

Figure 6:
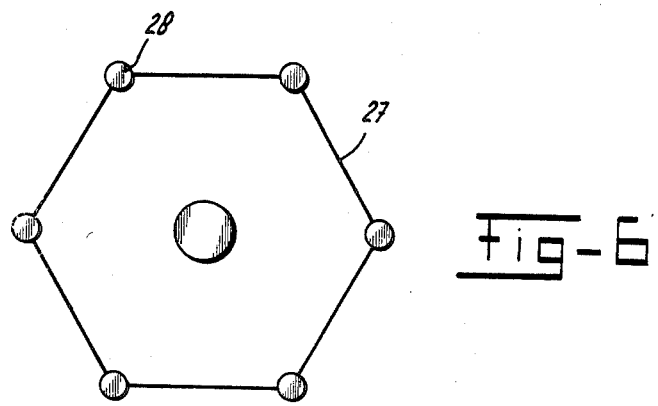
FIGS. 6 and 7 show in plan view two alternatives of a fender which surrounds the mooring body.

FIG. 6 shows that the supporting structure, forming the fender, also can be formed by a polygonal frame 27 provided with weights 28 e.g. at the corners.

Figure 7:
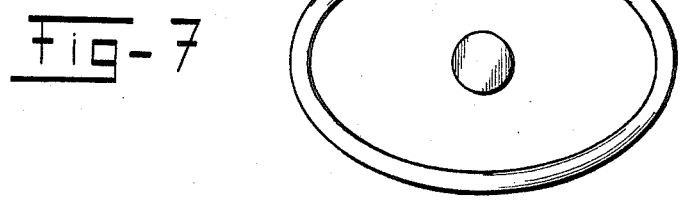

FIG. 7 shows that the fender in top view may be oval.

Figure 8:
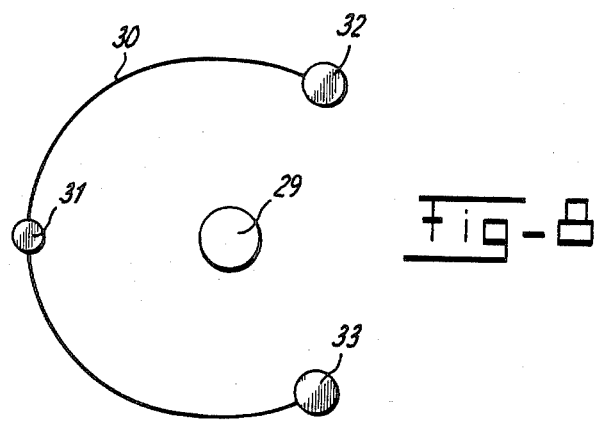
FIG. 8 shows in a way similar to FIGS. 6 and 7 a fender having the shape of a horse shoe.

FIG. 8 shows in top view a fender suspended from a tower 29, the supporting structure of which may be formed by a horse-shoe shaped frame 30 which at the side of the vessel has a relatively small weight 31 and which adjacent to the outer ends has heavy weights 32, 33.

Heavier weights at the side turned away from the vessel to be moored can be used with any type of fender according to the invention and has the advantage of generating larger return force components.

Figure 9:
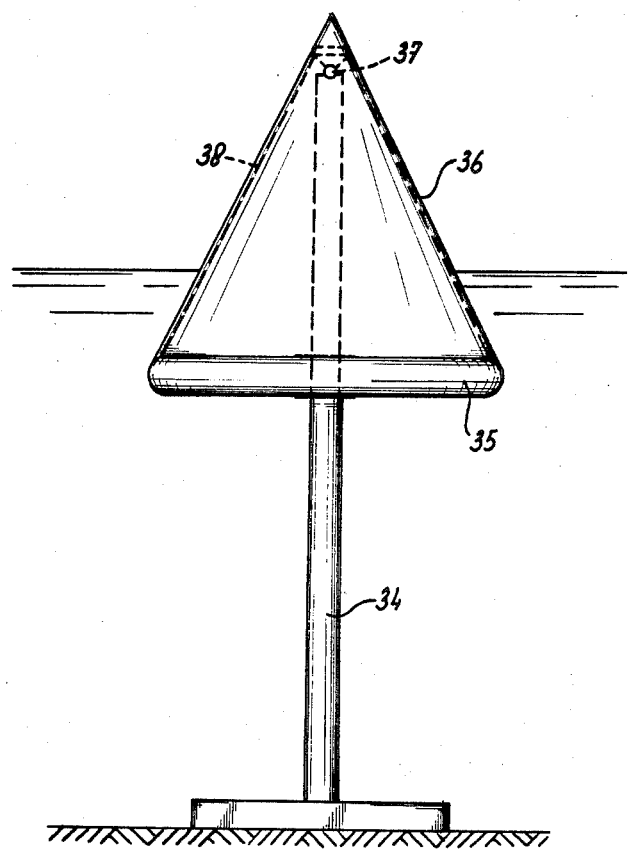
FIG. 9 shows a fender according to the invention in the form of a further alternative.

FIG. 9 shows an embodiment comprising a tower 34 rigidly mounted upon the sea bottom and a fender 35 in the form of a ring, which fender is supported from the top of the column 34 by means of a closed conical sleeve 36, the top of which is supported on the top of the column, e.g. by means of a universal joint 37.

Said conical sleeve may be the only means of connecting the fender 35 with the top of the column but also may be a sleeve which surrounds chains 38.

The conical sleeve 36 has the advantage that under arctic circumstances the continuous movements of the conical sleeve through the water prevent the formation of ice around the mooring arrangement. Chains of course do the same, but are less effective.

What is claimed is:

1. In a fender for absorbing forces of impact coming from a mooring or moored floating device, such as a vessel, which fender is suspended from a mooring body anchored with respect to the water bottom and is of the type allowing the moored device to swing around it about a vertical axis of rotation, said fender comprising a single supporting structure, which surrounds said vertical axis of rotation and the mooring body by more than 180° and which is loaded by weights and which at least at the side of the device that is moored or to be moored is at a distance from the mooring body, which supporting structure at a plurality of locations is suspended from the mooring body by means of movable connecting members attached at points which are at a higher level than the supporting structure, said connecting members all converging upwardly toward a single point and being attached at at least one point on the mooring body which lies on or adjacent to the vertical axis of rotation; the improvement in which said upwardly converging connecting members comprise the only means which determine the movement of said supporting structure relative to the mooring body, whereby upon pressure being applied by a said floating device to the supporting structure, the side of the supporting structure to which said pressure is applied will swing down and the opposite side of the supporting structure will swing up.

2. Fender as claimed in claim 1, characterized in that the supporting structure surrounds the mooring body in the form of a horseshoe or U.

3. Fender as claimed in claim 1, characterized in that the weight load is largest at those locations of the supporting structure which are on the side of the vertical axis of rotation which is opposite the side on which the moored device is attached or is to be attached.

4. Fender as claimed in claim 1, characterized in that the connecting members are formed by or surrounded by a conical sleeve with the top of the cone coinciding with the said vertical axis of rotation and with the lower edge of the cone joined to the supporting structure.

* * * * *